United States Patent
Bradford et al.

(10) Patent No.: US 10,258,917 B1
(45) Date of Patent: Apr. 16, 2019

(54) SYSTEM FOR REMOVING WATER AND PARTICULATES FROM ENGINE EXHAUST

(71) Applicant: Tenneco Automotive Operating Company Inc., Lake Forest, IL (US)

(72) Inventors: Michael C. Bradford, Chelsea, MI (US); Yong Sun, Ann Arbor, MI (US)

(73) Assignee: Tenneco Automotive Operating Company Inc., Lake Forest, IL (US)

(*) Notice: Subject to any disclaimer, the term of this patent is extended or adjusted under 35 U.S.C. 154(b) by 0 days.

(21) Appl. No.: 15/893,313

(22) Filed: Feb. 9, 2018

(51) Int. Cl.
| | |
|---|---|
| *B01D 50/00* | (2006.01) |
| *B01D 45/14* | (2006.01) |
| *B01D 46/54* | (2006.01) |
| *B01D 53/94* | (2006.01) |
| *B01D 46/00* | (2006.01) |
| *F01N 3/037* | (2006.01) |
| *F01N 3/035* | (2006.01) |
| *F01N 3/027* | (2006.01) |
| *F01N 3/022* | (2006.01) |

(52) U.S. Cl.
CPC ........... *B01D 50/002* (2013.01); *B01D 45/14* (2013.01); *B01D 46/0063* (2013.01); *B01D 46/543* (2013.01); *B01D 53/94* (2013.01); *F01N 3/027* (2013.01); *F01N 3/0222* (2013.01); *F01N 3/035* (2013.01); *F01N 3/037* (2013.01); *B01D 2255/9155* (2013.01); *B01D 2279/30* (2013.01); *F01N 2330/30* (2013.01); *F01N 2510/06* (2013.01)

(58) Field of Classification Search
CPC ..... F01N 3/0222; F01N 3/035; B01D 46/543; B01D 2255/9155; B01D 45/14
USPC ................. 422/169, 177, 180; 95/41, 34
See application file for complete search history.

(56) References Cited

U.S. PATENT DOCUMENTS

| | | | |
|---|---|---|---|
| 2,479,766 A | 8/1949 | Mulvany | |
| 3,349,548 A | 10/1967 | Boyen | |
| 3,944,402 A * | 3/1976 | Cherennisinoff | B01D 47/06 95/211 |
| 5,259,190 A * | 11/1993 | Bagley | B01D 46/0032 422/174 |
| 6,521,008 B1 * | 2/2003 | Lenzing | F02M 35/024 210/122 |
| 9,199,185 B2 | 12/2015 | Verdegan et al. | |
| 2008/0047239 A1 * | 2/2008 | Zheng | B01D 45/14 55/337 |
| 2014/0260211 A1 * | 9/2014 | Patchett | F01N 3/021 60/297 |
| 2016/0045841 A1 | 2/2016 | Kaplan et al. | |

(Continued)

FOREIGN PATENT DOCUMENTS

| | | |
|---|---|---|
| AU | 2009243195 A1 | 11/2009 |
| AU | 2009246711 A1 | 11/2009 |

(Continued)

*Primary Examiner* — Tom P Duong
(74) *Attorney, Agent, or Firm* — Bejin Bieneman PLC

(57) ABSTRACT

A system for a vehicle includes a water separator and a particulate filter. The vehicle includes an engine that emits exhaust, and the water separator and the particulate filter are disposed downstream of the engine and receives at least a portion of the exhaust. The water separator separates water from the exhaust, and the particulate filter filters particulates of the exhaust such that the water may be subsequently used, e.g., for potable uses, operation of the engine, etc.

19 Claims, 11 Drawing Sheets

(56) References Cited

U.S. PATENT DOCUMENTS

2016/0339453 A1* 11/2016 Lam .................. B01D 17/0217
2017/0241317 A1    8/2017 Bradford

FOREIGN PATENT DOCUMENTS

| | | |
|---|---|---|
| AU | 2009246711 B2 | 6/2014 |
| CA | 2855044 C | 12/2015 |
| CA | 2902255 C | 1/2016 |
| CA | 2902259 C | 2/2016 |
| CA | 2902264 C | 6/2016 |
| CN | 101558154 A | 10/2009 |
| CN | 102834670 A | 12/2012 |
| CN | 101952009 B | 9/2013 |
| CN | 103370495 A | 10/2013 |
| CN | 102656261 B | 7/2015 |
| CN | 103370495 B | 3/2016 |
| CN | 103939177 B | 4/2016 |
| CN | 103553163 B | 5/2016 |
| DE | 10120018 A1 | 12/2001 |
| JP | 2010048483 A | 3/2010 |
| KR | 20090068266 A | 6/2009 |
| WO | 2014153570 A2 | 9/2014 |

* cited by examiner

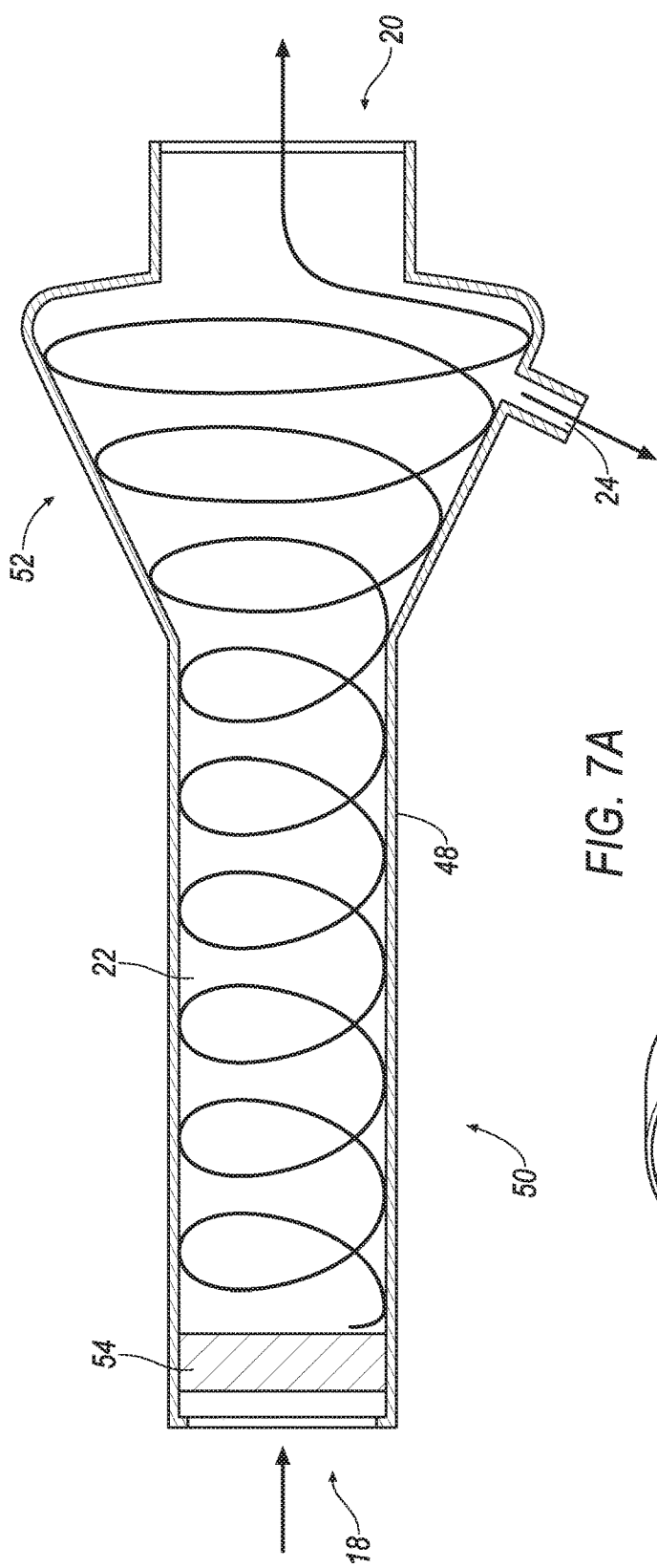
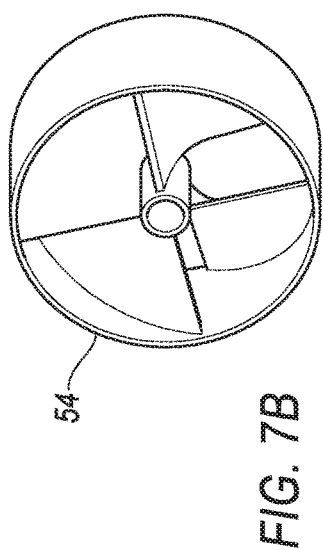
FIG. 7A
FIG. 7B

_US 10,258,917 B1_

SYSTEM FOR REMOVING WATER AND PARTICULATES FROM ENGINE EXHAUST

BACKGROUND

An engine, for example, an internal combustion engine for a vehicle, outputs exhaust during operation. The exhaust emitted from the engine may include gas (such as $NO_x$, $SO_x$, $CO_2$), water (including water vapor and/or condensed water droplets), particulates, etc. Particulates can be solid and/or liquid, and may include carbon and/or sulfuric acid, which are by-products of the combusted fuel, and may include hydrocarbons that are by-products of combusted fuel and/or burned lubricant.

BRIEF DESCRIPTION OF THE DRAWINGS

FIG. 7A is a cross-sectional view the water separator of FIG. 5.

FIG. 7B is a perspective view of a vane of the water separator of FIG. 7A.

DETAILED DESCRIPTION

Figure 1:
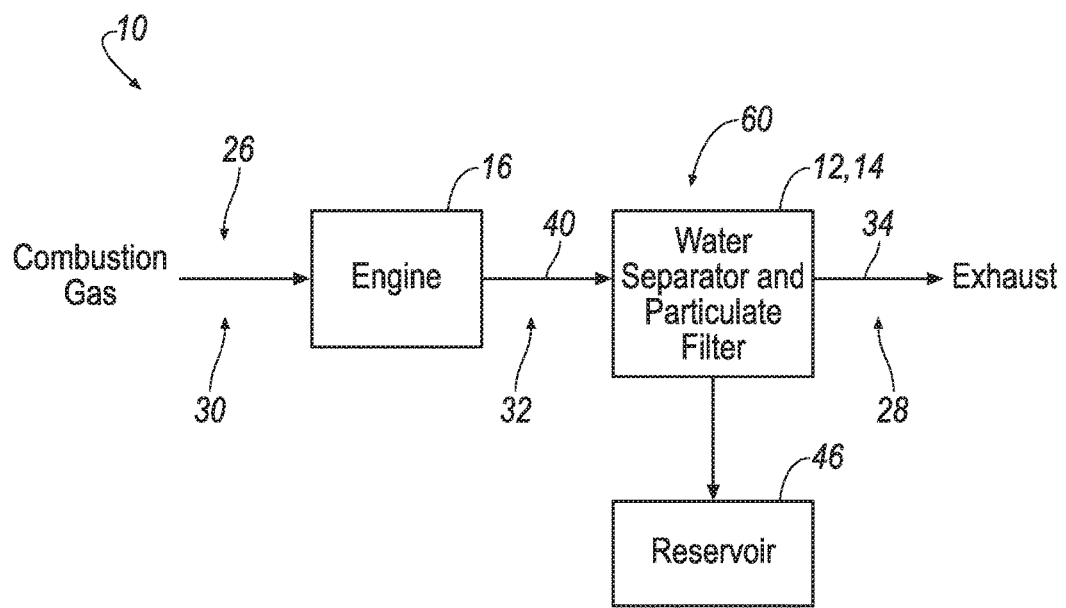
FIG. 1 is a schematic a system including a device having a water separator and a particulate filter in the water separator.

A device includes a water separator and a particulate filter. The water separator has a body, which has a gas inlet and a gas outlet. The body defines a gas passageway from the gas inlet to the gas outlet, and includes a water outlet in communication with the gas passageway.

In one embodiment, the particulate filter is fixed relative to the body in the gas passageway between the gas inlet and the water outlet.

In either or both of the previous two paragraphs, the water separator may be a cyclone water separator. In the example of the cyclone water separator, the gas passageway expands downstream of the vane. In such an example, the cyclone water separator may include a vane in the body, and the gas passageway expands downstream of the vane. The particulate filter may be either upstream of the vane or downstream of the vane.

In any one or a combination of the previous three paragraphs, the particulate filter may have a monolith substrate. In such an example, the monolith substrate may have pores between 0.5 μm and 50 μm. In combination with either or both of the previous two sentences, the particulate filter may have a membrane layer on the monolith substrate. In combination with one or any combination of the previous sentences in this paragraph, the particulate filter may have a catalyst layer on the monolith substrate.

In any one or a combination of the previous four paragraphs, the particulate filter may include a mat.

In any one or a combination of the previous five paragraphs, the device may include an electric heater on body around the particulate filter.

In one embodiment, a system includes a cyclone water separator having a gas inlet, a gas outlet, a gas passageway from the gas inlet to the gas outlet, and a water outlet in communication with the gas passageway. In this embodiment, a wall-flow filter is in communication with the cyclone water separator. The wall-flow filter has pores between 0.5 μm and 50 μm.

In the embodiment of the previous paragraph, in one example, the wall-flow filter may be connected to the water outlet downstream of the water outlet. As another example, the wall-flow filter may be upstream of the gas inlet of the cyclone water separator. As another example, the wall-flow filter may be fixed to the cyclone water separator in the gas passageway.

In either or both of the previous two paragraphs, the system may include a pressure source upstream of the wall-flow filter and/or a vacuum source downstream of the wall-flow filter.

In any one or a combination of the previous three paragraphs, the wall-flow filter may include a monolith substrate. In such an example, the wall-flow filter may include a membrane layer and/or a catalytic layer on the monolith substrate.

With reference to the Figures, wherein like numerals indicate like parts throughout the several views, a system 10, 110, 210 includes a water separator 12 and a particulate filter 14, 214. The water separator 12 removes water from exhaust from an engine 16, and the particulate filter 14, 214 removes particulates such that the system 10, 110, 210 produces water that includes little or no particulates. The water separator 12 has a gas inlet 18, a gas outlet 20, and a gas passageway 22 from the gas inlet 18 to the gas outlet 20. The water separator 12 includes a water outlet 24 in communication with the gas passageway 22. In one example of the system 10, the particulate filter 14 may be in the gas passageway 22 between the gas inlet 18 and the water outlet 24, an example of which is shown in FIGS. 1-4. In other examples of the system 110, 210, the particulate filter 14, 214 may be separate from the water separator 12, examples of which are shown in FIGS. 5-11. The water that is removed by the system 10, 110, 210 and includes little or no particulates may be, for example, stored for potable uses and/or re-used in operation of the engine 16. Water-depleted gas that exits the water separator 12 may be, for example, recirculated to the engine 16 and/or exhausted into the surrounding atmosphere. While the system 10, 110, 210 shown in the figures only includes one water separator 12 and one particulate filter 14, 214, the system 10, 110, 210 may include any suitable number of water separator 12s and/or particulate filters 14, 214, i.e., one or more water separators 12 and one or more particulate filters 14, 214.

The engine 16, for example, may be an internal combustion engine, such as a gasoline engine or a diesel engine. The engine 16 may be used in a vehicle. The vehicle may be a ground vehicle, such as a passenger automobile, truck, bus, etc.; a water vehicle, such as a boat, ship, etc., and/or an air vehicle, such as a plane, helicopter, etc. As another example, the engine 16 may be used in a stationary application or any other suitable application. The exhaust emitted from the engine 16 may include $NO_x$, $SO_x$, $CO_2$, water vapor, particulates, etc.

The system 10, 110, 210 includes an intake system 26 for feeding combustion gas to the engine 16, and an exhaust system 28 for exhausting exhaust from the engine 16. The intake system 26 draws in intake air from the atmosphere, and mixes fuel with the intake air to form a combustion gas. The fuel may be, for example, gasoline, diesel fuel, alcohol, methanol, ethanol, butanol, dimethylether, biodiesel, renewable diesel, kerosene, jet fuel, bunker fuel, etc. The intake system 26 includes an intake conduit 30 in communication with the engine 16 for feeding intake air to the engine 16.

Figure 2:
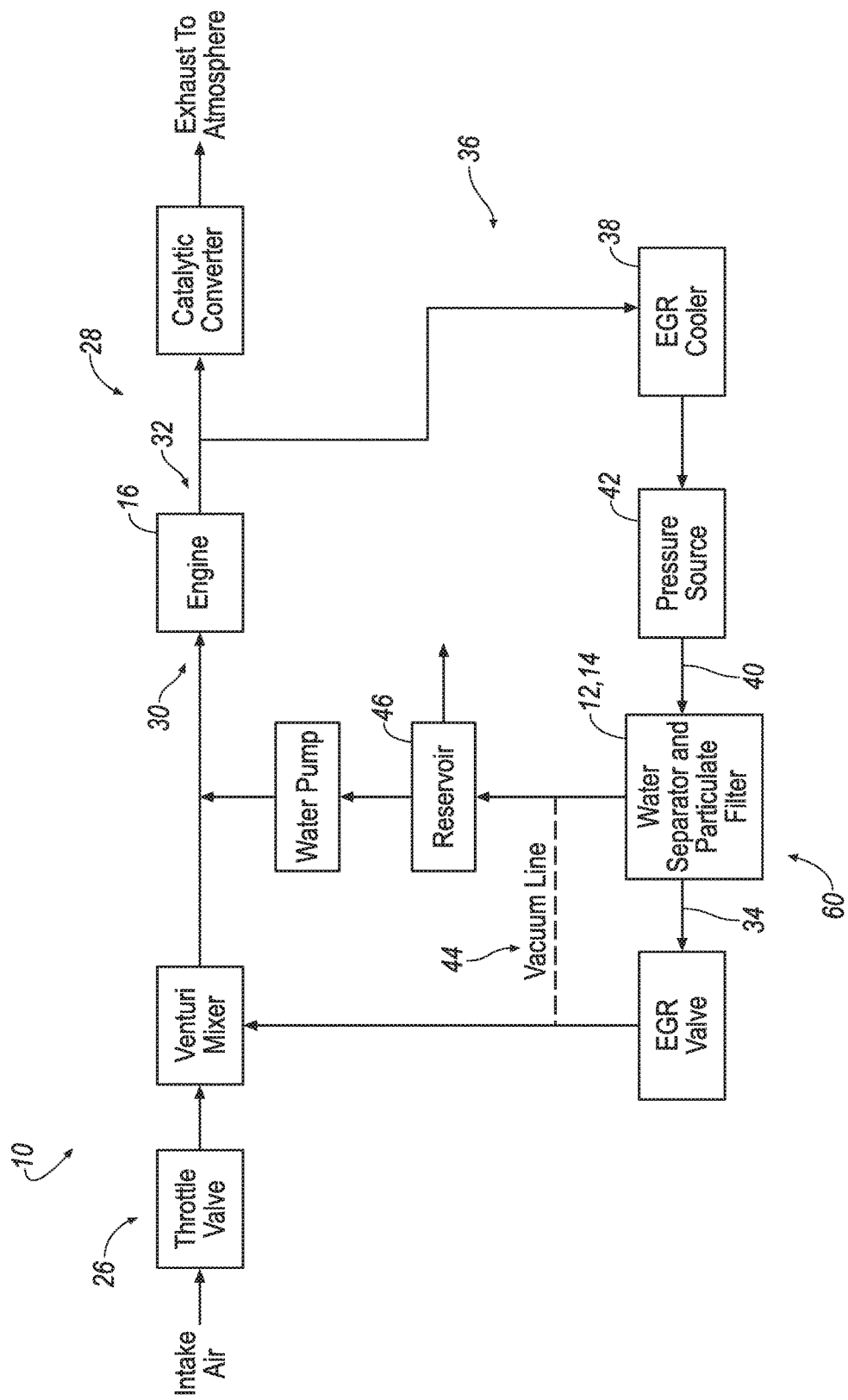
FIG. 2 is an example of the system of FIG. 1 including an EGR circuit.
Figure 6:
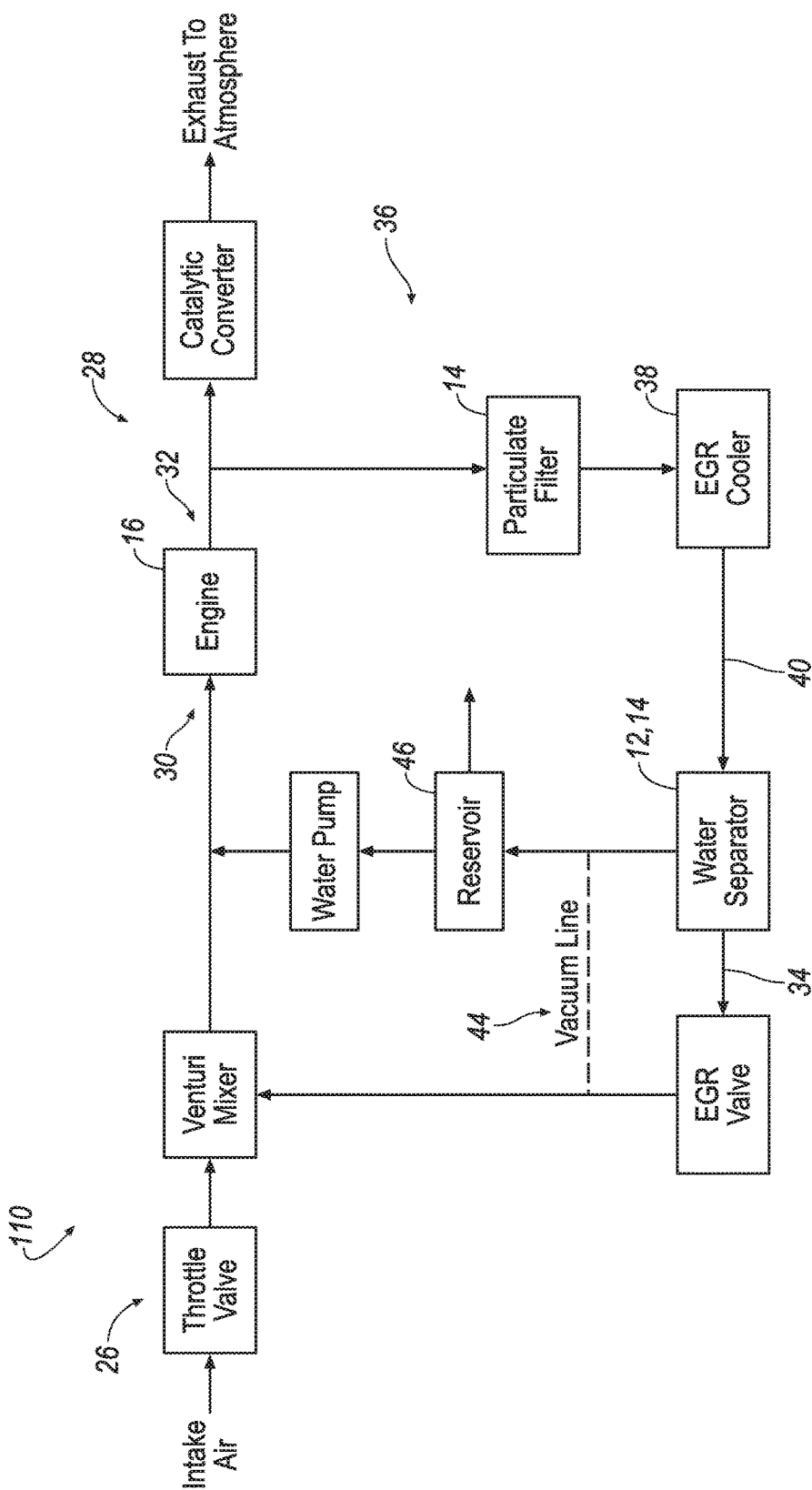
FIG. 6 is an example of the system of FIG. 5 including an EGR circuit.
Figure 9:
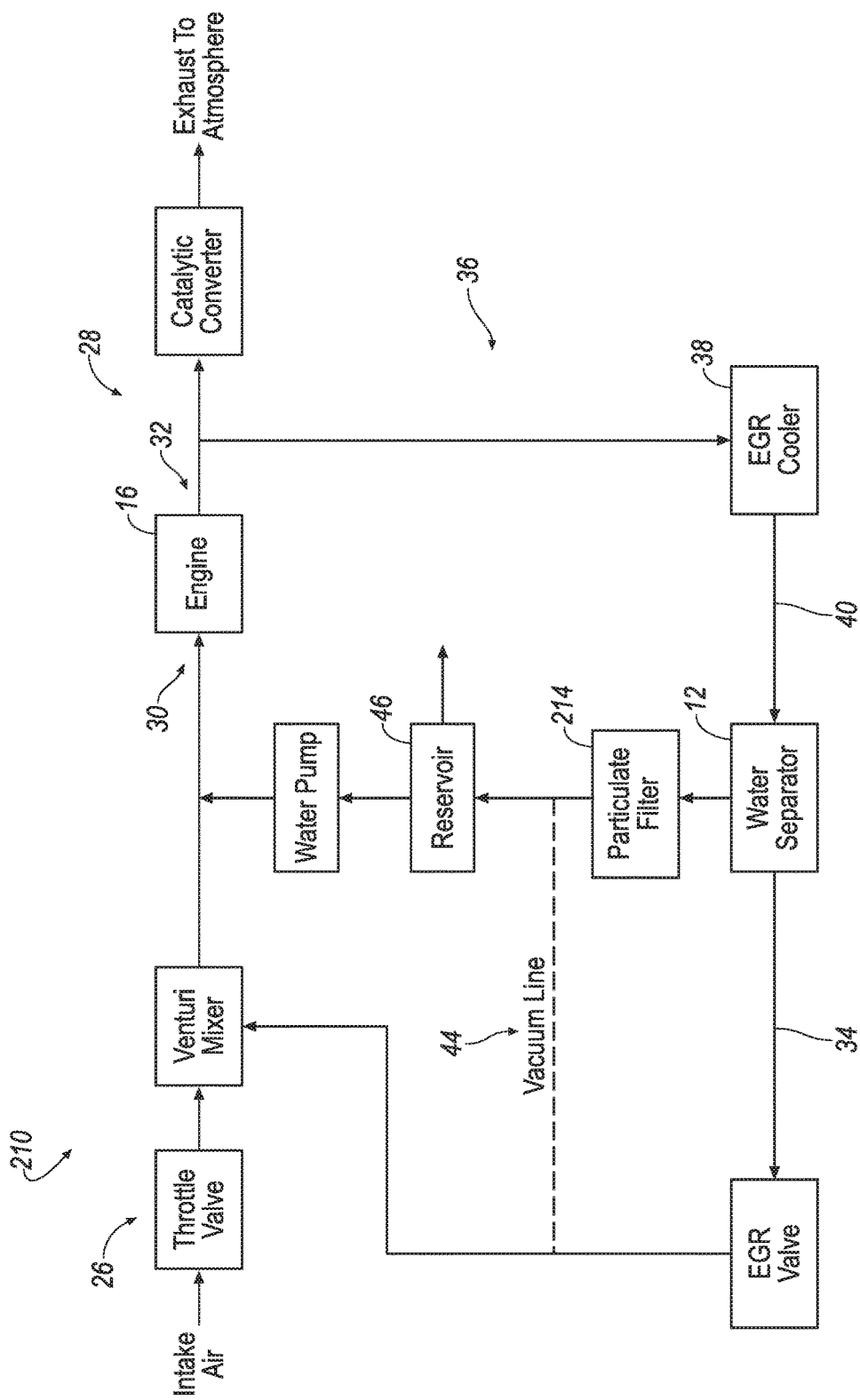
FIG. 9 is a schematic of the system of FIG. 8 including an EGR circuit.

The exhaust system 28 includes the exhaust conduit 32. The exhaust conduit 32 is upstream of the water separator 12, i.e., between the engine 16 and the water separator 12. The exhaust system 28 may include a downstream conduit 34 downstream of the water separator 12. The terms "upstream" and "downstream" are used throughout this document with reference to the flow of exhaust from the engine 16 through the exhaust system 28. The exhaust system 28 may have any suitable number of manifolds, conduits, paths, circuits, etc. As one example, as set forth further below, the exhaust system 28 may include an exhaust gas recirculation (EGR) circuit 36, as shown in FIGS. 2, 6, and 9, and described further below. The EGR circuit 36 recirculates a portion of the exhaust gases back to the engine 16 and allows a portion the exhaust to flow downstream to be exhausted to the atmosphere. Specifically, the EGR circuit 36 extends from the exhaust conduit 32 to the intake conduit 30. The EGR circuit 36 may include an EGR cooler 38 (i.e., an exhaust gas cooler in the EGR circuit 36) to cool the recirculated exhaust before introduction to the engine 16.

The water separator 12 may be in communication with a cooling device to cool the exhaust and/or the water separator 12. The cooling device may be between the engine 16 and the water separator 12. As one example, the cooling device may be in the exhaust system 28 upstream of the water separator 12 and in communication with the exhaust to cool the exhaust before the exhaust enters the water separator 12. As another example, in an example, where the system 10, 110, 210 includes an EGR circuit 36, the cooling device may be the EGR cooler 38. In other words, the water separator 12 may be downstream of the EGR cooler 38, as shown in FIGS. 2, 6, and 9. For example, the system 10, 110, 210 may include a charge air cooler, e.g., in an example where the system 10, 110, 210 includes a turbocharger and an EGR circuit 36, and the charge air cooler may be the cooling device. Specifically, the water separator 12 may be disposed between the charge air cooler and the engine 16, i.e., downstream of the charge air cooler and upstream of the engine 16. In this example, heat from the exhaust from the EGR circuit 36, and heat from the compression of the air by a compressor of the turbocharger, is removed from the air by the charge air cooler upstream of the water separator 12. As another example, the cooling device may be external to the exhaust system 28 and may cool the water separator 12. For example, a cooling system of the vehicle may be in communication with the water separator 12 to cool the water separator 12. In such an example, a component of the cooling system, e.g., a radiator, is the cooling device.

The system 10, 110, 210 includes an upstream conduit 40 directly upstream of the water separator 12. The upstream conduit 40 may be a component of the exhaust system 28, e.g., the EGR circuit 36, as shown in FIGS. 2, 6, and 9. The downstream conduit 34 is directly downstream of the water separator 12. As one example, the downstream conduit 34 may be a component of an intake system 26, as shown in the EGR circuits 36 in FIGS. 2, 6, and 9. As another example, the downstream conduit 34 may be a component of an exhaust system 28, e.g. in an example where the water separator 12 is not in an EGR circuit 36, such as in examples where the water separator 12 gas from the water separator 12 is not recirculated to engine 16, but instead is exhausted to atmosphere through the remainder of the exhaust system 28.

As shown in FIG. 2, the system 10 may create a negative pressure difference between the downstream conduit 34 and the upstream conduit 40 to draw the exhaust through the water separator 12 and increase flow through the particulate filter 14, 214. For example, the system 10 may include a pressure source 42 upstream of the water separator 12 and the particulate filter 14, 214 to create a pressure head upstream of the particulate filter 14, 214. The pressure source 42 may be a pump or may be a component of the vehicle that creates positive pressure. As another example, the system 10 may include a vacuum source 44 downstream of the water separator 12 and the particulate filter 14, 214. For example, the vacuum source 44 may be, for example, a tube, i.e., a vacuum line, extending from downstream of the water separator 12, e.g., from the EGR circuit 36 downstream of the water separator 12, to the intake system 26. The intake system 26 has a negative pressure during operation of the engine 16. As another example, the vacuum source 44 may be a vacuum pump, e.g., powered by the vehicle. While the system 10 shown in FIG. 2 includes both the pressure source 42 and the vacuum source 44, the system 10 may include one of the pressure source 42 and the vacuum source 44. Similarly, the systems 110, 210 may include one or both of the pressure source 42 and the vacuum source 44.

In the example shown in FIG. 1, the particulate filter 14 may be in the water separator 12 downstream of the engine 16. Specifically, as shown in FIG. 2, the water separator 12, and the particulate filter 14 in the water separator 12, may be in the EGR circuit 36. Water collected from the water separator 12 may be stored, for example, in a reservoir 46, for potable usage and/or for injection to the engine 16.

As set forth above, the water separator 12 separates water from the exhaust from the engine 16. As one example, the water separator 12 may be a cyclone water separator, as described further below. As another example, the water separator 12 may be a monolith, e.g. such as in U.S. patent application Ser. No. 15/648,748, which is, in its entirety, incorporated herein by reference. Alternatively, the water separator 12 may be of any suitable type.

In the example where the water separator 12 is a cyclone water separator, as shown in FIGS. 3, 4, and 7A-B, the water separator 12 may receive a two-phase flow including gas and condensed water droplets dispersed in the gas, as described further below. In other words, the condensed water droplets are carried with the gas into the water separator 12. The water separator 12 may swirl the two-phase flow into an expanding volume (as identified with the swirling line in FIGS. 3 and 7A), which causes the condensed water droplets to radiate outwardly and collect together, allowing the water to be withdrawn from the water separator 12.

Figure 3:
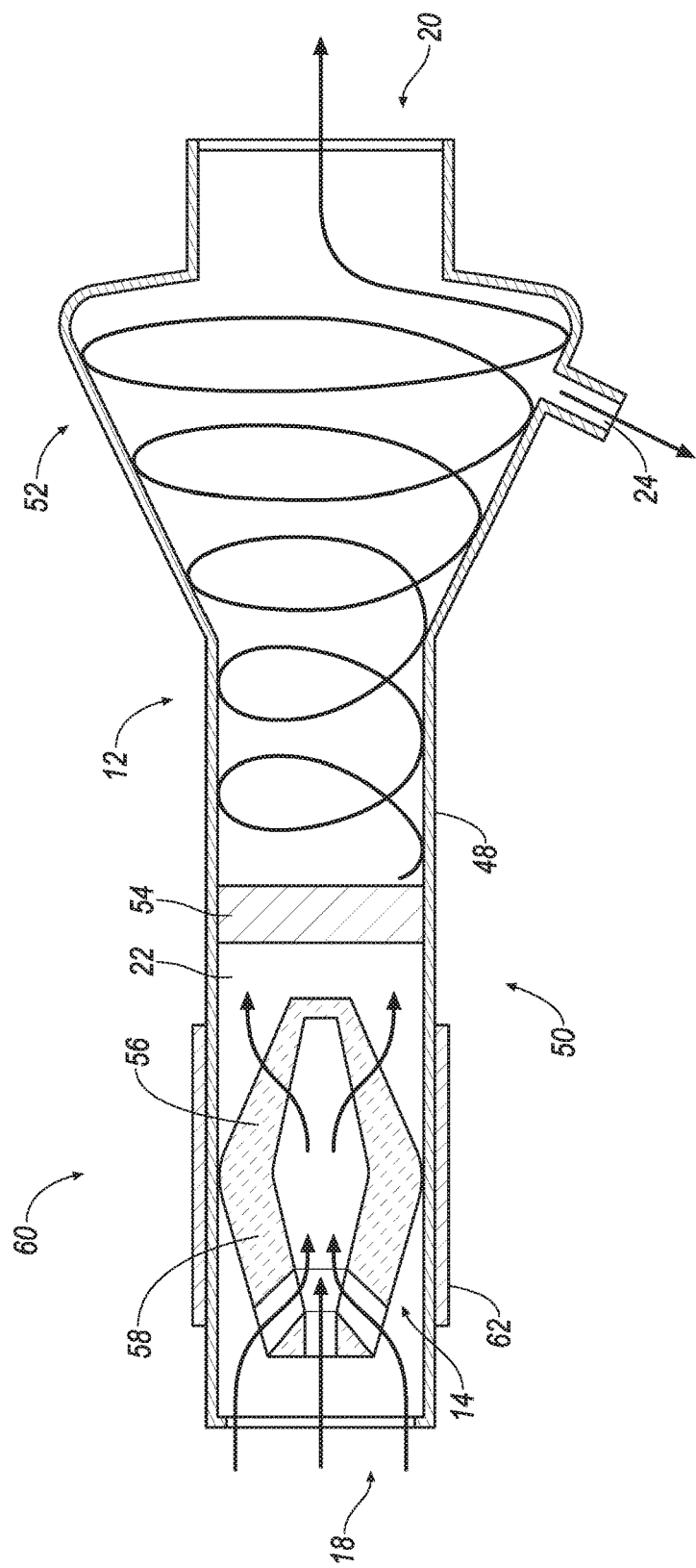
FIG. 3 is a cross-sectional view of one embodiment of the device of FIG. 1.
Figure 4:
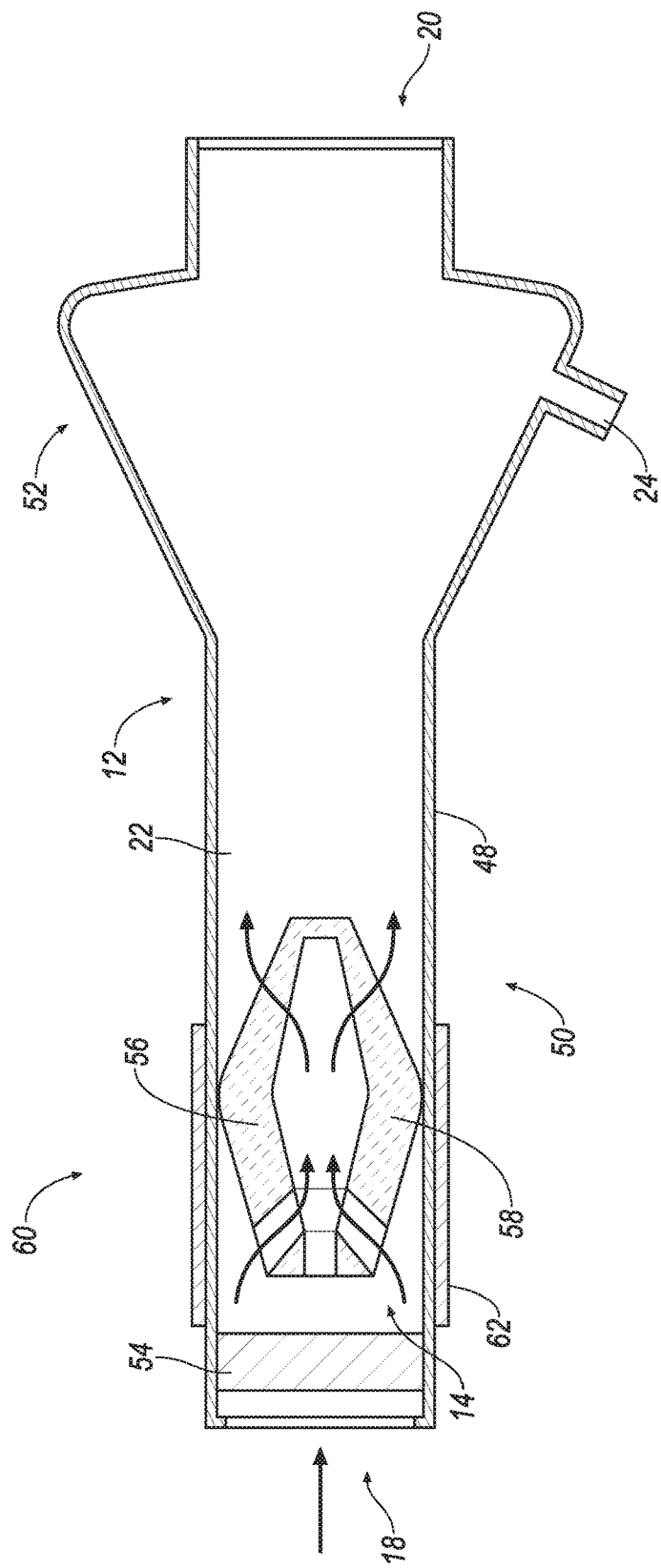
FIG. 4 is a cross-sectional view of another embodiment of the device of FIG. 1.

With reference to FIGS. 3-4, the water separator 12 includes a body 48. The body 48 the gas inlet 18 and the gas outlet 20. As shown schematically in FIGS. 1-2, the gas inlet 18 is connected to the upstream conduit 40, and the gas outlet 20 is connected to the downstream conduit 34. The upstream conduit 40 may feed the two-phase flow to the water separator 12. The two-phase flow originates, at least in part, with the exhaust from the engine 16. In other words, the exhaust from the engine 16 includes at least a portion of the gas and the water of the two-phase flow. As an example, the exhaust may include gas (including $NO_x$, $SO_x$, and $CO_2$), water vapor, particulates, etc. As the exhaust is cooled between the engine 16 and the water separator 12, the water vapor in the exhaust may condense into the water droplets to form the two-phase flow. In other words, the two-phase flow includes the gas (e.g., $N_2$, $CO_2$, $NO_x$, $SO_x$, etc.), particulates, etc., of the exhaust, and condensed water droplets. The particulates are mostly solid and may be entrained in the liquid and/or gas of the two-phase flow.

The body 48 defines a gas passageway 22 extending from the gas inlet 18 to the gas outlet 20. The gas passageway 22 allows gas to flow therethrough, i.e., from the gas inlet 18 to the gas outlet 20. In other words, the gas of the two-phase flow flows through the gas inlet 18 to the gas outlet 20. The gas passageway 22 may be unobstructed between the gas inlet 18 and the gas outlet 20, i.e., allowing free, unobstructed flow of gas from the gas inlet 18 to the gas outlet 20. Alternatively, water separator 12 may include additional features between the gas inlet 18 and the gas outlet 20, e.g., filters, treatments, etc., through which the gas must pass from the gas inlet 18 to the gas outlet 20. In any event, a flow path exists for at least a portion of the gas to flow from the gas inlet 18 to the gas outlet 20. The gas outlet 20 is connected to the downstream conduit 34.

The body 48 includes a water outlet 24 in communication with the gas passageway 22. In other words, condensed water droplets can flow from the gas passageway 22 to the water outlet 24. As the condensed water droplets are collected together in the water separator 12, this water exits the water separator 12 at the water outlet 24. The water outlet 24 is between the gas inlet 18 and the gas outlet 20. As the condensed water droplets are collected, the water exits the water separator 12 upstream of the gas outlet 20.

The gas passageway 22 expands in a direction from the gas inlet 18 to the gas outlet 20, i.e., in a downstream direction. Specifically, the gas passageway 22 may have an upstream section 50 that has a constant cross-section, and a downstream section 52 that has an expanding cross-section. For example, the upstream section 50 may be cylindrical, and the downstream section 52 may be frusto-conical. In such an example, the two-phase flow may swirl about the longitudinal axis of the upstream section 50, causing the relatively heavier water droplets to radiate outwardly. As the two-phase flow reaches the downstream section 52, these outwardly positioned condensed water droplets slow as the cross-section expands, causing the water droplets to collect on an inner surface of the downstream section 52 and fall toward the water outlet 24. The water outlet 24 may face downwardly, and the water may exit through the water outlet 24 under the force of gravity.

As shown in FIGS. 7A-B, the water separator 12 may include a vane 54 for inducing swirling of the two-phase flow. The vane 54 may be positioned in the upstream section 50. The vane 54 may be fixed to the body 48 or may rotate relative to the body 48. The vane 54 may be disposed upstream of the upstream section 50, i.e., the gas passageway 22 expands downstream of the vane 54.

Figure 5:
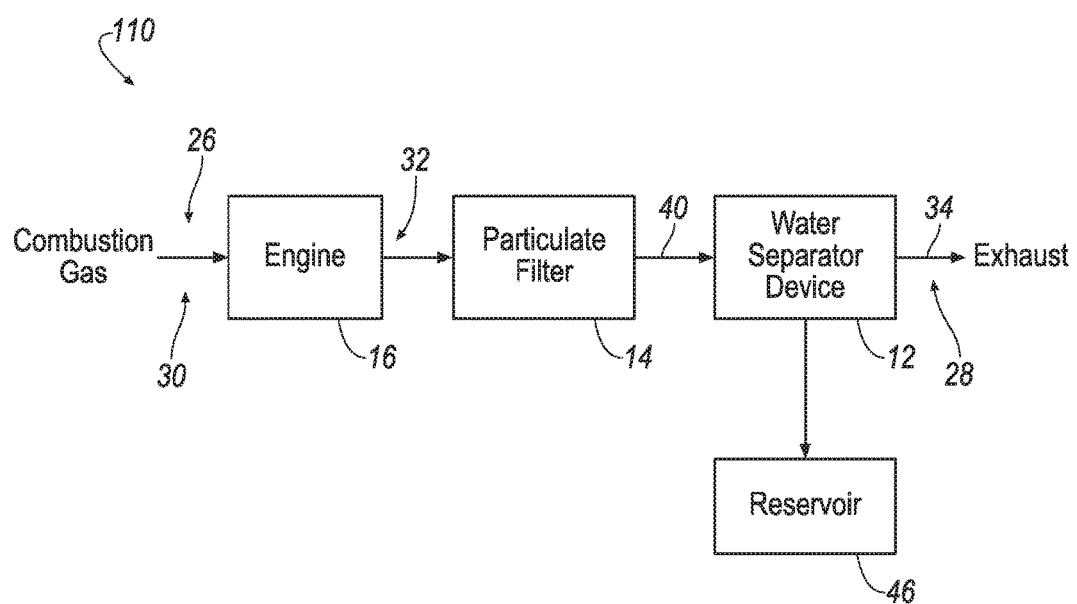
FIG. 5 is a schematic of a system including a particulate filter upstream of a water separator.

Various examples of the particulate filter 14, 214 are shown in the figures. For example, the particulate filter 14 in FIGS. 3-4 is a wall-flow filter in the body 48 of the water separator 12. The particulate filter 14 in FIGS. 5-6 is a wall-flow filter upstream of the water separator 12 to filter particulates from the exhaust before the exhaust enters the water separator 12. The particulate filter 14 of FIGS. 3-4 and 5-6 may be configured to receive the exhaust in gaseous form and to filter particulates from gas and/or may be configured to receive the two-phase flow described above and to filter particulates from the two-phase flow. The particulate filter 214 in FIGS. 8-11 is a water wall-flow filter downstream of the water outlet 24 to filter particulates from the condensed water exiting through the water outlet 24. For the purposes of this disclosure, the "wall-flow filter" is a filter in which the filtrate flows through a monolith substrate wall of the particulate filter 14, 214, as described further below.

With reference to FIGS. 3-4, as set forth above, the particulate filter 14 is in the body 48 of the water separator 12. In other words, the system 10 may include a device 60 that includes the water separator 12 and the particulate filter 14 in the water separator. For example, the water separator 12 in FIGS. 3-4 is the cyclone water separator, and the particulate filter 14 is the wall-flow filter fixed to the water separator 12 of FIGS. 3-4, i.e., the cyclone water separator, in the gas passageway 22. The particulate filter 14 of FIGS. 3-4, i.e., the wall-flow filter, allows for the gas and condensed water droplets of the two-phase flow to flow through the wall-flow filter, and prevents the particulate of the two-phase flow from flowing through the wall-flow filter.

With continued reference to FIGS. 3-4, the particulate filter 14 of FIGS. 3-4, i.e., the wall-flow filter, is fixed relative to the body 48 in the gas passageway 22 between the gas inlet 18 and the water outlet 24. The wall-flow filter may be fixed directly to the body 48 in any suitable fashion, e.g., adhesive, brazing, etc. Specifically, an outer surface of the wall-flow filter is fixed to the body 48. The wall-flow filter is in the upstream section 50 of the body 48 of the water separator 12. The wall-flow filter may be upstream of the vane 54, as shown in FIG. 3, or may be downstream of the vane 54, as shown in FIG. 4.

As shown in FIGS. 3-4, the particulate filter of FIGS. 3-4, i.e., the wall-flow filter, includes a wall 56 that extends across the entire gas passageway 22 of the body 48. In other words, gas and condensed water droplets must pass through the wall 56 to move past the wall-flow filter toward the downstream section 52 of the body 48. The wall 56 of the wall-flow filter may have any suitable inlets, internal channels, etc.

With continued reference to FIGS. 3-4, the particulate filter 14 may have a monolith substrate 58. The material of the monolith substrate 58 may be ceramic, metal, or a combination thereof. As one example, the material of the monolith substrate 58 may include metal carbide. The metal carbide may be a mono-metal carbide or a multi-metal carbide. As one example, the material of the monolith substrate 58 may be silicon carbide. As another example, the material of the monolith substrate 58 may be cordierite. The material of the monolith substrate 58 may be doped to achieve the desired thermal conductivity of the monolith substrate 58.

The monolith substrate 58 may be porous, i.e., includes pores sized to allow the gas and condensed water droplets of the two-phase flow to flow therethrough. The pores of the monolith substrate 58 are also sized to prevent substantially all of the particulate of the two-phase flow from flowing through the monolith substrate 58. Specifically, substantially all of the pores monolith substrate 58 are between 0.5 μm and 50 μm. "Substantially all" is based on the amount of non-uniformity, i.e., imperfections, in the crystalline structure of the monolith substrate 58. As an example, more than 90% of the pores are between 0.5 and 50. It should be appreciated that not all of the pores have an identical size and shape. The term "pore size" with reference to the pores refers to an average diameter of the pores. More specifically, there will be a pore size distribution, and the term "pore size" may refer to the mean or median of the distribution.

The monolith substrate 58 may be one piece. For example, the monolith substrate 58 may formed as, and/or from, a single piece of material without seams or joints. As another example, the monolith substrate 58 may be formed of several pieces that are separately formed and subsequently bonded together in any suitable fashion, e.g., with ceramic cement, to form the monolith substrate 58. In such an example, material used to bond, e.g., the ceramic cement, may include a porous interface that does not significantly inhibit flow of the gas and the condensed water droplets through the monolith substrate 58, in particular across the interface at the bond.

With continued reference to FIGS. 3-4, the particulate filter 14, i.e., the wall-flow filter of FIGS. 3-4 may include a membrane layer on the monolith substrate 58. The membrane layer may be on an upstream surface of the wall 56 and/or may be on a downstream surface of the wall. The membrane layer may be porous, i.e., includes pores sized to allow the gas and condensed water droplets of the two-phase flow to flow therethrough. The pores of the membrane layer may also be sized to prevent substantially all of the particulate of the two-phase flow from flowing through the monolith substrate 58. The pores of the membrane layer may be smaller than the pores of the monolith substrate 58 such that the particulates are filtered by the membrane layer, and the gas and condensed water droplets more efficiently move across the monolith substrate 58. For example, substantially all of the pores membrane layer are between 0.01 μm and 0.50 μm. "Substantially all" is based on the amount of non-uniformity, i.e., imperfections, in the crystalline structure of the membrane layer. As an example, more than 90% of the pores are between 0.01 μm and 0.50 μm. It should be appreciated that not all of the pores have an identical size and shape. The term "pore size" with reference to the pores refers to an average diameter of the pores. More specifically, there will be a pore size distribution, and the term "pore size" may refer to the mean or median of the distribution.

The membrane layer may have a thickness of between 0.01 μm and 1000 μm. The wall of the monolith substrate may have a thickness of between 0.2 mm and 2.0 mm.

The material of the membrane layer may be a ceramic. The material of the membrane layer may include a metal oxide. Specifically, the material of the membrane layer may be a porous metal oxide. For example, the material of the membrane layer may include alumina, silica, titania, and/or silicon carbide.

With continued reference to FIGS. 3-4, the wall-flow filter may include a catalytic layer on the monolith substrate 58. As described below, the wall-flow filter may be heated, which heats the catalytic layer to gasify particulates on the catalytic layer. The catalytic layer may be of any suitable material, e.g., known materials for oxidation of soot and/or hydrocarbons. For example, the catalytic layer may be mixed metal oxides (such as perovskites, spinels, etc. that may include zirconia, cerium, alumina, silica, etc. As another example, the catalytic layer may be a precious metal such as platinum, palladium, rhodium, etc.

In the alternative to the wall-flow filter shown in FIGS. 3-4, the particulate filter 14 may be a mat filter. The mat filter may include fibers that are woven and/or matted. In such an example, the fibers may be ceramic and/or metal. As another example, in the alternative to the wall-flow filter shown in FIGS. 3-4, the particulate filter 14 may be a metal sponge. The metal sponge may include an open cellular structure in which the metal substrate is about 5%-25% of the volume. In the examples of the mat filter and the metal sponge, the particulate filter 14 extends across the entire gas passageway 22 of the body 48 and allows for the gas and condensed water droplets of the two-phase flow to flow through the particulate filter 14 (e.g., between the fibers of the mat filter; through the cellular structure of the metal sponge) and prevents the particulate of the two-phase flow from flowing through the wall-flow filter (i.e., the particulates are trapped in the fibers of the mat filter or cellular structure).

As another alternative to the wall-flow filter shown in FIGS. 3-4, the particulate filter 14 may be a selective adsorbent. The selective adsorbent may be of any suitable type, and the type of selective adsorbent may be based on the desired adsorbate. As an example, the adsorbate may be ions that affect the pH of the condensed water, e.g., sulfate or nitrate ions. In such an example, the adsorbent may be a porous carbonaceous material including mixed metal oxides, zeolites, etc.

With reference to FIG. 5, the particulate filter 14 may be upstream of the water separator 12. For example, as shown in FIG. 6, the particulate filter 14 and the water separator 12 may be in the EGR circuit 36 with the particulate filter 14 upstream of the water separator 12. Specifically, the particulate filter 14 may be upstream of the gas inlet 18 of the water separator 12. As shown in FIG. 7A, the water separator 12 of the system 110 of FIGS. 5 and 6 may be a cyclone water separator, as described above. In one embodiment, the only difference between the cyclone water separator of FIG. 4 and the cyclone water separator of FIG. 7A is the location of the particulate filter 14, i.e., in the body 48 in FIG. 4 and upstream of the cyclone water separator in FIG. 7A.

The systems 10, 110 shown in FIGS. 1-2 and 5-6 may heat the particulate filter 14 to clean the particulate filter 14. Specifically, at least some of the particulates trapped by the particulate filter 14 are carbonaceous and will gasify when maintained at an elevated temperature in the presence of air and moisture or another suitable oxidant. As one example, as shown in FIGS. 3-4, the device 60 may include a sleeve 62 that heats the particulate filter 14 to a temperature sufficient to gasify the carbonaceous particulates. The sleeve 62 may be electric, i.e., may generate heat electrically, e.g., by resistive heating.

The sleeve 62 is positioned around the particulate filter 14 to heat the particulate filter 14. For example, the sleeve 62 may extend circumferentially around the particulate filter 14. As one example, the sleeve 62 may be on an exterior of the body 48, as shown in FIGS. 3-4. As another example, the sleeve 62 may be in the gas passageway 22 of the body 48, e.g., on an interior surface of the body 48 and/or on an exterior surface of the particulate filter 14.

As another example, the systems 10, 110 of FIGS. 1-2 and 5-6 may elevate the temperature of the particulate filter 14 with heat from the exhaust. The system 10 may monitor and control the temperature of the exhaust entering the particulate filter 14, and may periodically increase the temperature of the exhaust entering the particulate filter 14 to elevate the temperature of the particulate filter 14 to a temperature to gasify the carbonaceous particulates on the particulate filter 14. For example, the system 10, 110 includes one or more coolers, e.g., the EGR cooler 38, through which the exhaust flows downstream of the engine 16 and upstream of the particulate filter 14 to selectively cool the exhaust. The system 10, 110 may control the cooler to control the cooling of the exhaust, e.g., by controlling the temperature of the cooler, a proportion of exhaust flowing through the cooler, etc. For example, the system 10, 110 may include an engine 16 control module and/or an emissions control module of the vehicle, which controls the cooler.

Figure 8:
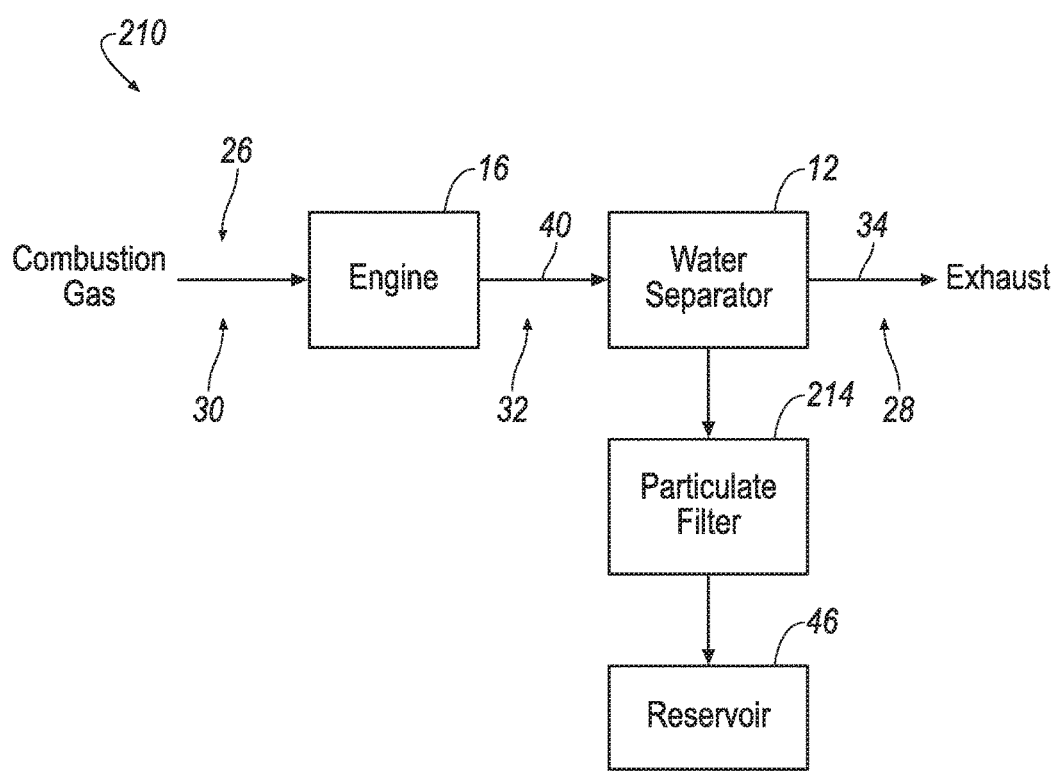
FIG. 8 is a schematic of a system including a particulate filter downstream of a water outlet of a water separator.

With reference to FIG. 8, the particulate filter 214 may be separate from the water separator 12 and downstream of the water separator 12, i.e., is a water wall-flow filter. Specifically, with reference to FIG. 9, the particulate filter 214 may be connected to the water outlet 24 downstream of the water outlet 24. Since the particulate filter 214 is downstream of the water separator 12, particulates in the exhaust may contaminate the water as the water condenses in the water separator 12. The particulate filter 214 separates the particulates from the condensed water downstream of the water separator 12.

Figure 10:
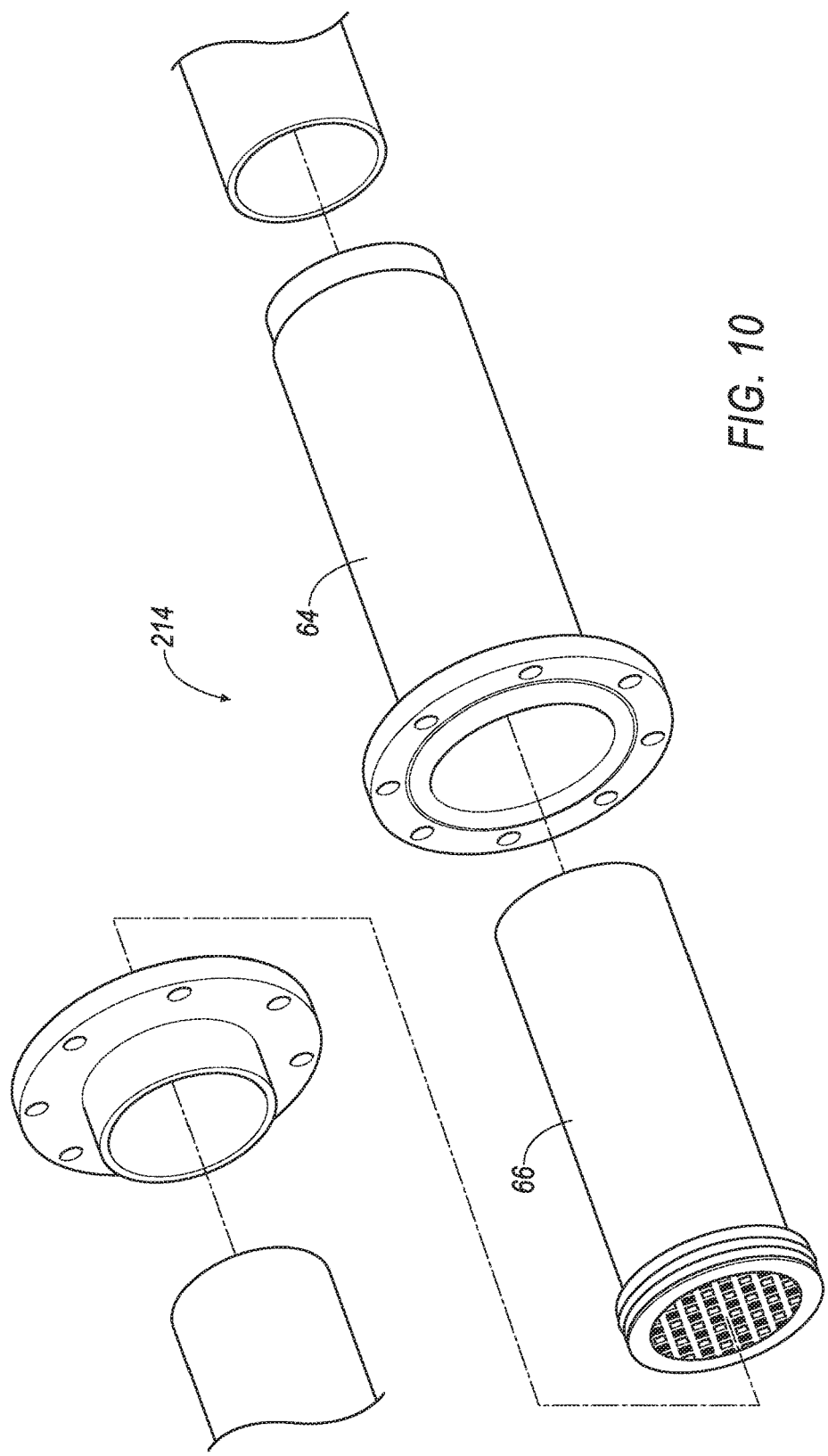
FIG. 10 is a perspective view of the particulate filter of FIG. 8.
Figure 11:
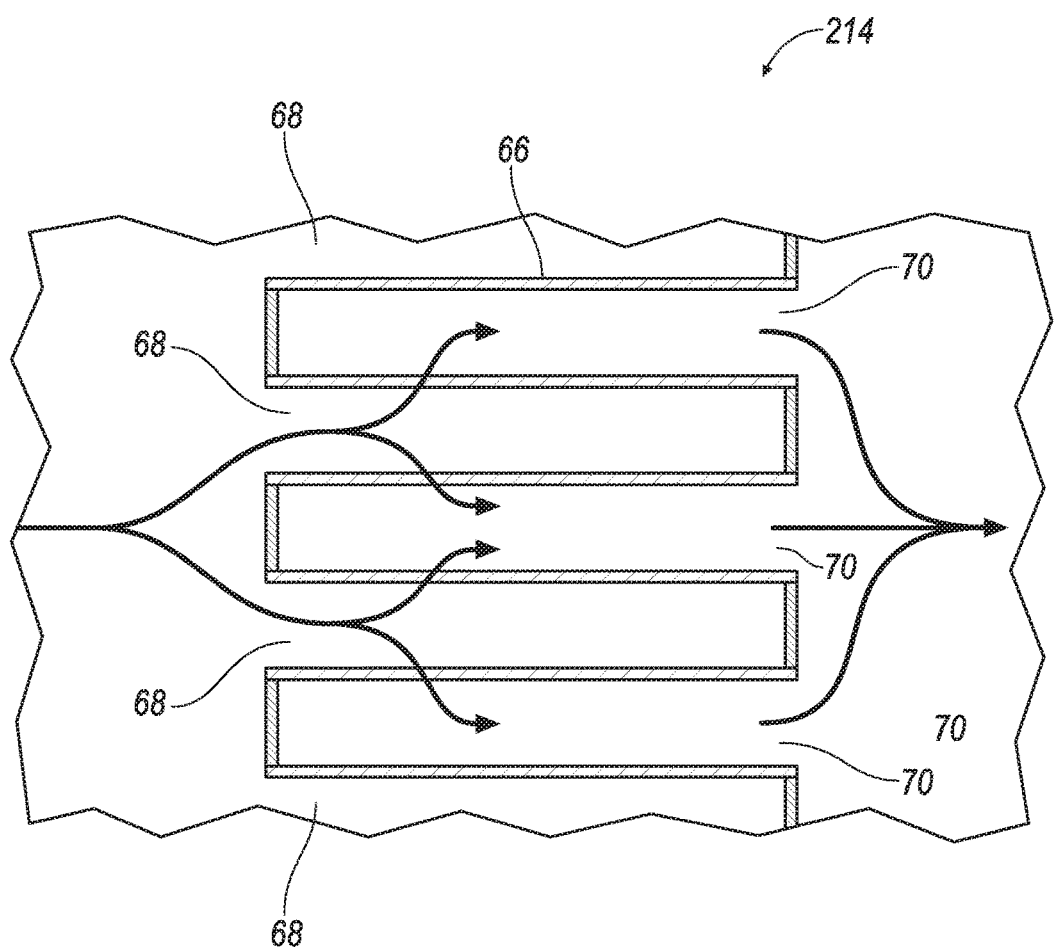
FIG. 11 is a cross-sectional view of the particulate filter of FIG. 10.

With reference to FIGS. 10 and 11, the particulate filter 214 may include a housing 64 and a substrate 66 in the housing 64. The substrate 66 may be sealed to the housing 64 such that all water that enters the housing 64 passes through the particulate filter 214.

The substrate 66 may separate input channels 68 and output channels 70, as identified in FIG. 11. As shown in FIG. 11, the condensed water flows through the substrate 66 from the input channels 68 to the output channels 70. Substantially all of the particulates in the condensed water remain in the input channels 68 and do not flow through the substrate 66.

The substrate 66 may be a monolith substrate. In such an example, the material of the substrate 66 may be ceramic, metal, or a combination thereof. As one example, the material of the substrate 66 may include metal carbide. The metal carbide may be a mono-metal carbide or a multi-metal carbide. As one example, the substrate may be silicon carbide. As another example, the material of the substrate 66 may be cordierite.

With continued reference to FIGS. 10-11, the substrate 66 may be porous, i.e., includes pores sized to allow the condensed water to flow therethrough. The pores of the substrate 66 are also sized to prevent substantially all of the particulates in the condensed water from flowing through the substrate 66. Specifically, substantially all of the pores substrate 66 are between 0.5 µm and 50 µm. "Substantially all" is based on the amount of non-uniformity, i.e., imperfections, in the crystalline structure of the substrate 66. As an example, more than 90% of the pores are between 0.5 µm and 50 µm. It should be appreciated that not all of the pores have an identical size and shape. The term "pore size" with reference to the pores refers to an average diameter of the pores. More specifically, there will be a pore size distribution, and the term "pore size" may refer to the mean or median of the distribution.

With continued reference to FIGS. 10-11, the substrate 66 may be one piece. For example, the substrate 66 may formed as, and/or from, a single piece of material without seams or joints. As another example, the substrate 66 may be formed of several pieces that are separately formed and subsequently bonded together in any suitable fashion, e.g., with ceramic cement, to form the substrate 66. In such an example, material used to bond, e.g., the ceramic cement, may include a porous interface that does not significantly inhibit flow of water through the substrate 66, in particular across the interface at the bond.

With continued reference to FIGS. 8-11 the wall-flow filter may include a membrane layer on the substrate 66. The membrane layer on the substrate 66 may be on an upstream surface of the substrate 66 and/or may be on a downstream surface of the substrate 66. The membrane layer on the substrate 66 may be porous, i.e., includes pores sized to allow the condensed water to flow therethrough. The pores of the membrane layer on the substrate 66 may also be sized to prevent substantially all of the particulate of the two-phase flow from flowing through the substrate 66. The pores of the membrane layer on the substrate 66 may be smaller than the pores of the substrate 66 such that the particulates are filtered by the membrane layer, and the condensed water more efficiently move across the substrate 66. For example, substantially all of the pores of the membrane layer are between 0.01 µm and 0.50 µm. "Substantially all" is based on the amount of non-uniformity, i.e., imperfections, in the crystalline structure of the membrane layer. As an example, more than 90% of the pores are between 0.01 µm and 0.50 µm. It should be appreciated that not all of the pores have an identical size and shape. The term "pore size" with reference to the pores refers to an average diameter of the pores. More specifically, there will be a pore size distribution, and the term "pore size" may refer to the mean or median of the distribution.

The material of the membrane layer on the substrate 66 may be a ceramic. The material of the membrane layer on the substrate 66 may include a metal oxide. Specifically, the material of the membrane layer on the substrate 66 may be a porous metal oxide. For example, the material of the membrane layer of the substrate may include alumina, silica, titania, and/or silicon carbide.

As another example, the particulate filter 214 of the device of FIGS. 10-11 may be a mat filter. The mat filter may include fibers that are woven and/or matted. In such an example, the fibers may be ceramic and/or metal. As another example, the particulate filter 214 of FIGS. 10-11 may be a metal sponge. The metal sponge may include an open cellular structure with high porosity, e.g., the metal substrate is 5%-25% of the volume. In the examples of the mat filter and the metal sponge, the particulate filter 214 extends across the entire gas passageway 22 of the body 48 and allows for the condensed water to flow through the particulate filter 214 (e.g., between the fibers of the mat filter; through the cellular structure of the metal sponge) and prevents the particulates from flowing through the wall-flow filter (i.e., the particulates are trapped in the fibers of the mat filter or cellular structure).

As another example, the particulate filter 214 of FIGS. 10-11 may be a selective adsorbent.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A device comprising:
a water separator having a body, the body having a gas inlet and a gas outlet and defining a gas passageway from the gas inlet to the gas outlet, the body including a water outlet in communication with the gas passageway; and
a particulate filter fixed relative to the body in the gas passageway between the gas inlet and the water outlet; wherein the particulate filter has a monolith substrate.

2. The device as set forth in claim 1, wherein the water separator is a cyclone water separator.

3. The device as set forth in claim 2, wherein the water separator includes a vane in the body.

4. The device as set forth in claim 3, wherein the gas passageway expands downstream of the vane.

5. The device as set forth in claim 3, wherein the particulate filter is upstream of the vane.

6. The device as set forth in claim 1, wherein the monolith substrate has pores between 0.5 μm and 50 μm.

7. The device as set forth in claim 1, wherein the particulate filter has a membrane layer on the monolith substrate.

8. The device as set forth in claim 1, wherein the particulate filter has a catalyst layer on the monolith substrate.

9. The device as set forth in claim 1, further comprising an electric heater on the body around particulate filter.

10. The device as set forth in claim 1, wherein the water separator is a cyclone water separator downstream of the particulate filter, wherein the particulate filter has a monolith substrate has pores between 0.5 μm and 50 μm.

11. A system comprising:
a cyclone water separator having a gas inlet, a gas outlet, a gas passageway from the gas inlet to the gas outlet, and a water outlet in communication with the gas passageway; and
a wall-flow filter in communication with the cyclone water separator, the wall-flow filter having pores between 0.5 μm and 50 μm.

12. The system as set forth in claim 11, wherein the wall-flow filter is connected to the water outlet downstream of the water outlet.

13. The system as set forth in claim 11, wherein the wall-flow filter is upstream of the gas inlet of the cyclone water separator.

14. The system as set forth in claim 11, wherein the wall-flow filter is fixed to the cyclone water separator in the gas passageway.

15. The system as set forth in claim 14, further comprising a pressure source upstream of the wall-flow filter.

16. The system as set forth in claim 14, further comprising a vacuum source downstream of the wall-flow filter.

17. The system as set forth in claim 11, wherein the wall-flow filter includes a monolith substrate and a membrane layer on the monolith substrate.

18. The system as set forth in claim 11, wherein the wall-flow filter includes a monolith substrate and a catalytic layer on the monolith substrate.

19. A device comprising:
a water separator having a body, the body having a gas inlet and a gas outlet and defining a gas passageway from the gas inlet to the gas outlet, the body including a water outlet in communication with the gas passageway; and
a particulate filter fixed relative to the body in the gas passageway between the gas inlet and the water outlet;
wherein the particulate filter includes a mat.

* * * * *